(12) United States Patent
Blaney et al.

(10) Patent No.: US 10,247,028 B2
(45) Date of Patent: Apr. 2, 2019

(54) GAS TURBINE ENGINE BLADE OUTER AIR SEAL THERMAL CONTROL SYSTEM

(71) Applicant: United Technologies Corporation, Farmington, CT (US)

(72) Inventors: Ken F. Blaney, Middleton, NH (US); Paul M. Lutjen, Kennebunkport, ME (US)

(73) Assignee: United Technologies Corporation, Farmington, CT (US)

( * ) Notice: Subject to any disclaimer, the term of this patent is extended or adjusted under 35 U.S.C. 154(b) by 372 days.

(21) Appl. No.: 15/025,602

(22) PCT Filed: Aug. 5, 2014

(86) PCT No.: PCT/US2014/049745
§ 371 (c)(1),
(2) Date: Mar. 29, 2016

(87) PCT Pub. No.: WO2015/069338
PCT Pub. Date: May 14, 2015

(65) Prior Publication Data
US 2016/0237842 A1    Aug. 18, 2016

Related U.S. Application Data

(60) Provisional application No. 61/887,691, filed on Oct. 7, 2013.

(51) Int. Cl.
*F01D 11/08* (2006.01)
*F01D 11/18* (2006.01)
*F16J 15/44* (2006.01)

(52) U.S. Cl.
CPC ............ *F01D 11/18* (2013.01); *F01D 11/08* (2013.01); *F16J 15/445* (2013.01); *F05D 2220/32* (2013.01); *F05D 2230/60* (2013.01); *F05D 2240/55* (2013.01); *F05D 2240/91* (2013.01); *F05D 2260/30* (2013.01); *F05D 2300/5021* (2013.01); *Y02T 50/672* (2013.01)

(58) Field of Classification Search
CPC ........ F01D 11/08; F01D 11/18; F01D 25/246; F01D 25/06; F01D 25/24; F01D 5/02; F01D 5/10; F01D 5/16; F01D 5/26; F16J 15/445; F05D 2260/30; F05D 2230/60
See application file for complete search history.

(56) References Cited

U.S. PATENT DOCUMENTS

| | | | |
|---|---|---|---|
| 4,050,843 A * | 9/1977 | Needham | F01D 11/18 415/116 |
| 5,092,737 A | 3/1992 | Lau | |
| 5,127,793 A * | 7/1992 | Walker | F01D 11/08 415/115 |
| 5,207,560 A | 5/1993 | Urban | |

(Continued)

OTHER PUBLICATIONS

Extended EP Search Report dated Oct. 5, 2016.

*Primary Examiner* — Igor Kershteyn
*Assistant Examiner* — Topaz L. Elliott
(74) *Attorney, Agent, or Firm* — O'Shea Getz P.C.

(57) ABSTRACT

A clearance control system for a gas turbine engine is provided. The system includes an inner axial wall that extends between a forward wall and an aft wall. The system also includes an outer axial wall that extends parallel to the inner axial wall to pivotally receive a full hoop thermal control ring.

15 Claims, 8 Drawing Sheets

(56) References Cited

U.S. PATENT DOCUMENTS

| | | | |
|---|---|---|---|
| 5,314,303 A | 5/1994 | Charbonnel et al. | |
| 5,316,437 A | 5/1994 | Czachor | |
| 5,330,321 A * | 7/1994 | Roberts | F01D 11/18 415/136 |
| 5,553,999 A * | 9/1996 | Proctor | F01D 11/08 415/134 |
| 5,593,278 A * | 1/1997 | Jourdain | F01D 11/18 415/116 |
| 5,639,210 A * | 6/1997 | Carpenter | F01D 11/18 415/135 |
| 5,641,267 A * | 6/1997 | Proctor | F01D 11/08 415/173.1 |
| 6,382,905 B1 | 5/2002 | Czachor et al. | |
| 6,702,550 B2 * | 3/2004 | Darkins, Jr. | F01D 9/04 415/116 |
| 6,896,483 B2 * | 5/2005 | Dierksmeier | F01D 11/18 403/28 |
| 7,094,029 B2 | 8/2006 | Taylor et al. | |
| 7,210,899 B2 | 5/2007 | Wilson, Jr. | |
| 7,338,253 B2 * | 3/2008 | Nigmatulin | F01D 11/005 415/139 |
| 7,771,160 B2 * | 8/2010 | Shi | F01D 9/04 415/138 |
| 7,946,807 B2 * | 5/2011 | Philippot | F01D 11/18 415/173.1 |
| 8,011,883 B2 | 9/2011 | Schwarz et al. | |
| 8,341,798 B2 | 1/2013 | Scott, Sr. et al. | |
| 2003/0049121 A1 * | 3/2003 | Dierksmeier | F01D 11/18 415/173.1 |
| 2003/0170115 A1 | 9/2003 | Bowen et al. | |
| 2005/0265827 A1 | 12/2005 | Wilson, Jr. | |
| 2006/0083607 A1 | 4/2006 | Synnott et al. | |
| 2009/0208322 A1 | 8/2009 | McCaffrey | |
| 2011/0052367 A1 | 3/2011 | Martin et al. | |
| 2012/0275898 A1 | 11/2012 | McCaffrey et al. | |
| 2012/0292856 A1 * | 11/2012 | Pelletier | F01D 9/04 277/345 |

* cited by examiner

GAS TURBINE ENGINE BLADE OUTER AIR SEAL THERMAL CONTROL SYSTEM

CROSS-REFERENCE TO RELATED APPLICATION

This application claims priority to PCT Patent Application No. PCT/US14/049745 filed Aug. 5, 2014, which claims priority to U.S. Patent Application No. 61/887,691 filed Oct. 7, 2013, which are hereby incorporated herein by reference in their entireties.

STATEMENT REGARDING FEDERALLY SPONSORED RESEARCH OR DEVELOPMENT

This disclosure was made with Government support under FA8650-09-D-2923 0021 awarded by the United States Air Force. The Government may have certain rights in this disclosure.

BACKGROUND

The present disclosure relates to a gas turbine engine and, more particularly, to a blade tip clearance control system therefor.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases. The compressor and turbine sections include rotatable blade and stationary vane arrays. Within an engine case structure, the radial outermost tips of each blade array are positioned in close proximity to a shroud assembly. Blade Outer Air Seals (BOAS) supported by the shroud assembly are located adjacent to the blade tips such that a radial tip clearance is defined therebetween.

When in operation, the thermal environment in the engine varies and may cause thermal expansion and contraction such that the radial tip clearance varies. The radial tip clearance may be influenced by mechanical loading (e.g., radial expansion of the blades and/or their supporting disks due to speed-dependent centrifugal loading) and thermal expansion (e.g., of the blades/disks on the one hand and the non-rotating structure on the other). The radial tip clearance is typically designed so that the blade tips do not rub against the BOAS under high power operations when the blade disk and blades expand as a result of thermal expansion and centrifugal loads. When engine power is reduced, the radial tip clearance increases. The leakage of core air between the tip of the turbine blades and the BOAS may have a negative effect on engine performance/efficiency, fuel burn, and component life.

To facilitate engine performance, at least some engines include a blade tip clearance control system to maintain a close radial tip clearance.

SUMMARY

A carrier segment of a clearance control system for a gas turbine engine, according to one disclosed non-limiting embodiment of the present disclosure, includes an inner axial wall that extends between a forward wall and an aft wall. The carrier segment also includes an outer axial wall that extends parallel to the inner axial wall the outer axial wall axially shorter than the inner axial wall.

In a further embodiment of the present disclosure, the inner axial wall extends between a forward wall and an aft wall.

In a further embodiment of any of the foregoing embodiments of the present disclosure, the outer axial wall extends from the forward wall.

In a further embodiment of any of the foregoing embodiments of the present disclosure, a forward feature and an aft feature are included that extend radially from the inner axial wall.

In a further embodiment of any of the foregoing embodiments of the present disclosure, an end wall is included that extends beyond an outer surface of the inner axial wall.

In a further embodiment of any of the foregoing embodiments of the present disclosure, a heat shield is mounted between the outer axial wall and the end wall.

In a further embodiment of any of the foregoing embodiments of the present disclosure, the heat shield is L-shaped in cross section.

A clearance control system of a gas turbine engine, according to another disclosed non-limiting embodiment of the present disclosure, includes a full hoop thermal control ring. The clearance control system also includes a multiple of carrier segments which are pivotally received onto the full hoop thermal control ring, and a multiple of blade outer air seals mounted to the multiple of carrier segments.

In a further embodiment of any of the foregoing embodiments of the present disclosure, the multiple of blade outer air seals locally bound a radially outboard extreme of a core flowpath through the gas turbine engine.

In a further embodiment of any of the foregoing embodiments of the present disclosure, each of the multiple of carrier segments include a forward feature and an aft feature engaged with respective reciprocally directed blade outer air seal forward features and aft features.

In a further embodiment of any of the foregoing embodiments of the present disclosure, each of the multiple of carrier segments includes an inner axial wall that extends between a forward wall and an aft wall. An outer axial wall extends parallel to the inner axial wall.

In a further embodiment of any of the foregoing embodiments of the present disclosure, an end wall is included that extends radially beyond an outer surface of the inner axial wall.

In a further embodiment of any of the foregoing embodiments of the present disclosure, a heat shield is mounted between the outer axial wall and the end wall.

In a further embodiment of any of the foregoing embodiments of the present disclosure, the heat shield is L-shaped in cross section.

In a further embodiment of any of the foregoing embodiments of the present disclosure, a snap ring is include to at least partially axially retain the full hoop thermal control ring.

A method of assembling a clearance control system for a gas turbine engine, according to another disclosed non-limiting embodiment of the present disclosure, includes pivotally receiving a multiple of carrier segments onto a full hoop thermal control ring.

In a further embodiment of any of the foregoing embodiments of the present disclosure, the method includes mounting a multiple of blade outer air seals to each of the multiple of carrier segments.

In a further embodiment of any of the foregoing embodiments of the present disclosure, the method includes sealing each of the multiple of blade outer air seals one to another.

In a further embodiment of any of the foregoing embodiments of the present disclosure, the method includes at least partially encapsulating the full hoop thermal control ring with a heat shield.

In a further embodiment of any of the foregoing embodiments of the present disclosure, the method includes axially retaining the heat shield.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
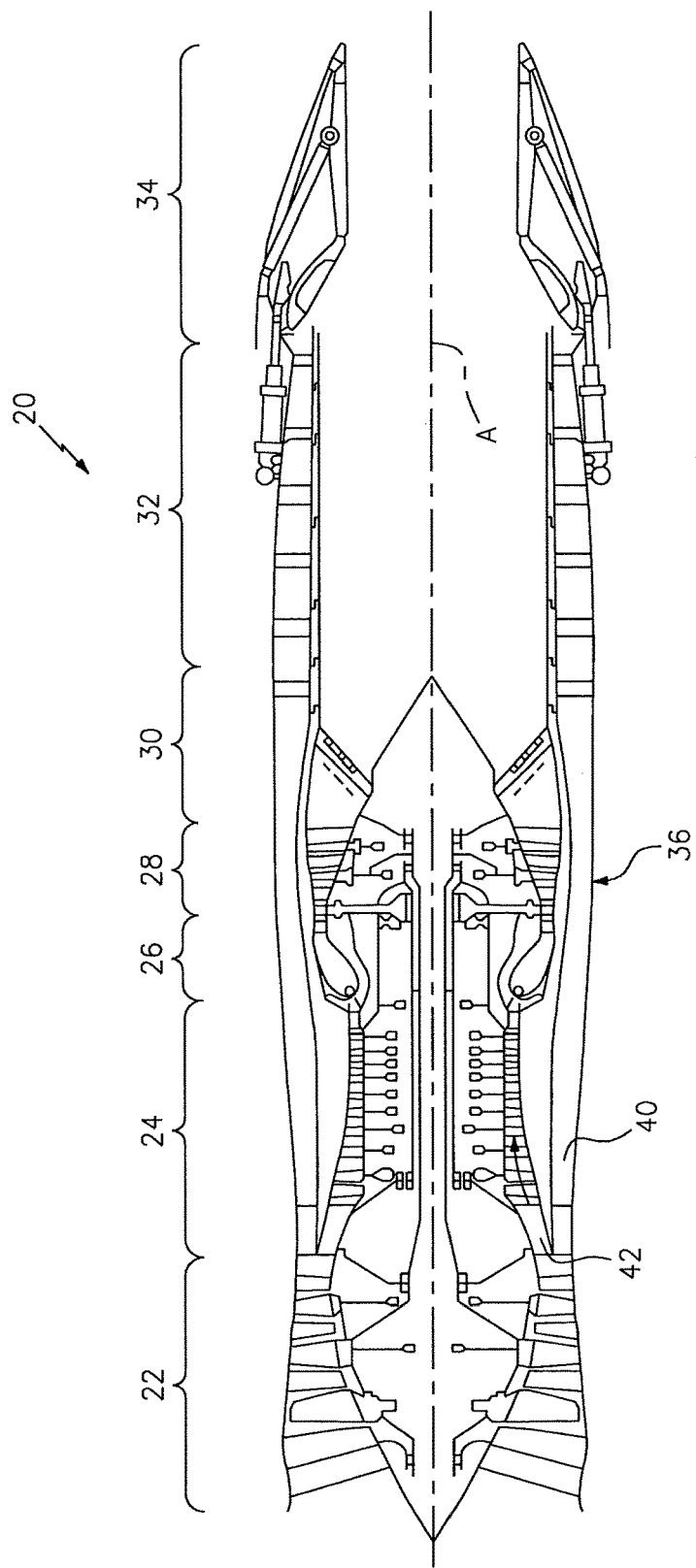
FIG. 1 is a schematic cross-section of one example aero gas turbine engine.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case structure 36 defines a generally annular secondary airflow path 40 around a core airflow path 42. Various static structures and modules may define the engine case structure 36 that essentially defines an exoskeleton to support the rotational hardware.

Air that enters the fan section 22 is divided between a core airflow through the core airflow path 42 and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Figure 2:
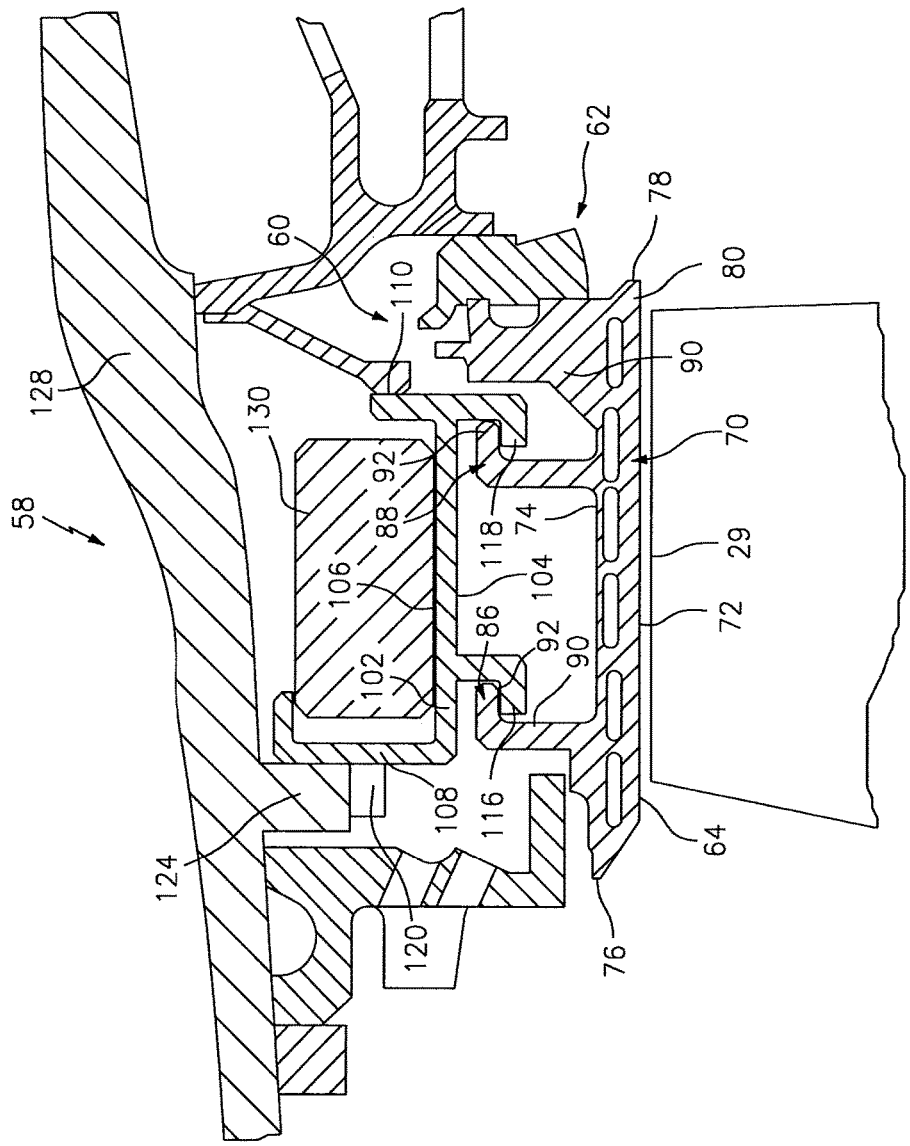
FIG. 2 is an enlarged sectional view of a portion of a clearance control system according to one disclosed non-limiting embodiment.
Figure 3:
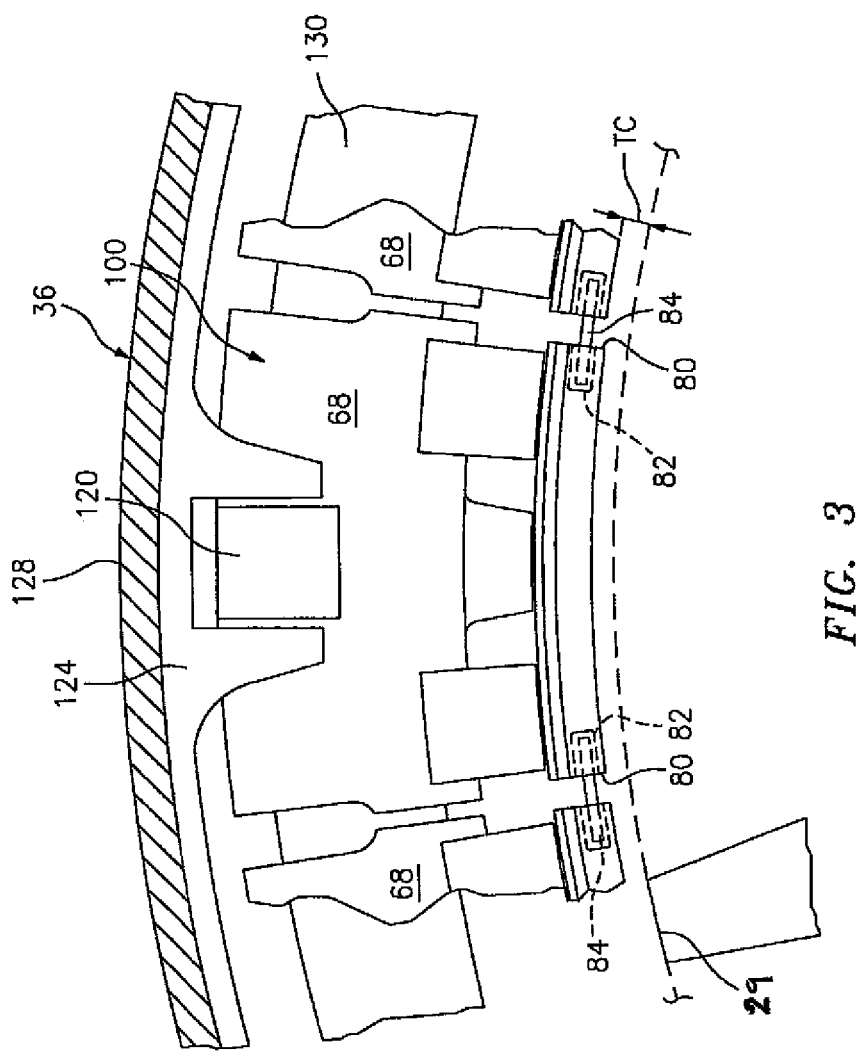
FIG. 3 is front view of a portion of the clearance control system.

With reference to FIGS. 2 and 3, a blade tip clearance control system 58 includes a radially adjustable Blade Outer Air Seal (BOAS) System 60 that operates to control blade tip clearances inside for example, the turbine section 28 (FIG. 1), however, other sections such as the compressor section 24 may also benefit herefrom. The radially adjustable BOAS System 60 may be arranged around each or particular stages within the gas turbine engine 20. That is, each rotor stage may have an independent radially adjustable BOAS system 60 of the system 58.

The BOAS system 60 locally bounds the radially outboard extreme of the core flowpath through the engine. Each BOAS system 60 is subdivided into a multiple of circumferential BOAS assemblies 62, each of which includes a multiple of BOAS 64 and a multiple of BOAS carrier segments 68. In one disclosed non-limiting embodiment, three (3) BOAS are mounted to one (1) BOAS carrier segment 68. It should be appreciated that any number of circumferential BOAS assemblies 62 and various other components may alternatively or additionally be provided.

Each BOAS 64 accommodates potential interaction with the rotating blade tips 29 with a relatively high coefficient of Thermal Expansion (CTE) material, e.g., a metal alloy such as a cast nickel-based superalloy. Each BOAS 64 generally includes a main body 70 with an inner face 72 and an outer face 74. The main body 70 extends from an upstream end 76 to a downstream end 78 and has a first and a second circumferential face 80. Each of the circumferential faces 80 may bear a seal slot 82. With the array assembled, adjacent circumferential faces 80 of adjacent BOAS 64 come into facing alignment with each other and may receive corresponding edge portions of a seal 84, e.g., a metallic feather seal (FIG. 3).

Radially outboard of the outer face 74, each BOAS 64 may include forward features 86 and aft features 88. Features such as lugs with a radially outward projecting proximal or leg portion 90 and an axially projecting distal portion 92 project, for example, axially forward for the forward feature 86 and axially forward for the aft feature 88. Each BOAS 64 may have a pair of such fore and aft lugs adjacent each circumferential face 80. The BOAS 64 may also have an internal cooling passage system and a thermal barrier coating.

Each of the multiple of BOAS carrier segments 68 may be manufactured of a relatively high coefficient of Thermal Expansion (CTE) material; e.g., a metal alloy such as a nickel-based superalloy. Each BOAS carrier segment 68 generally includes a main body 100 that is generally U-shaped in cross-section. The main body 100 (FIG. 3) includes an inner axial wall 102 with an inner surface 104 and an outer surface 106. Inboard of the inner surface 104 of the inner axial wall 102, each of the multiple of BOAS carrier segments 68 includes a forward feature 116 and an aft feature 118, which engage the reciprocally directed BOAS forward feature 86 and aft features 88. The forward feature 116 and the aft feature 118 of each BOAS carrier segment 68 may also be circumferentially segmented or otherwise configured for assembly of the BOAS 64 thereto (FIG. 3).

The forward wall 108 and the aft wall 110 of each of the multiple of BOAS carrier segments 68 respectively includes at least one of a forward (shown) and/or aft lug 120. The forward and/or aft lugs 120 engage with a respective forward and/or aft radially-inwardly extending web 124. The webs 124 extend from a sidewall 128 of the engine case structure 36. That is, each of the multiple of BOAS carrier segments 68 are at least partially circumferentially and axially positioned by the static engine case structure 36 such that the interface between the lugs 120 and the web 124 permits relative radial movement. The multiple circumferentially arranged BOAS carrier segments 68 accommodate radial movement yet the BOAS 64 remain sealed through the movement of the seals 84 within the respective slots of adjacent BOAS 64.

Figure 4:
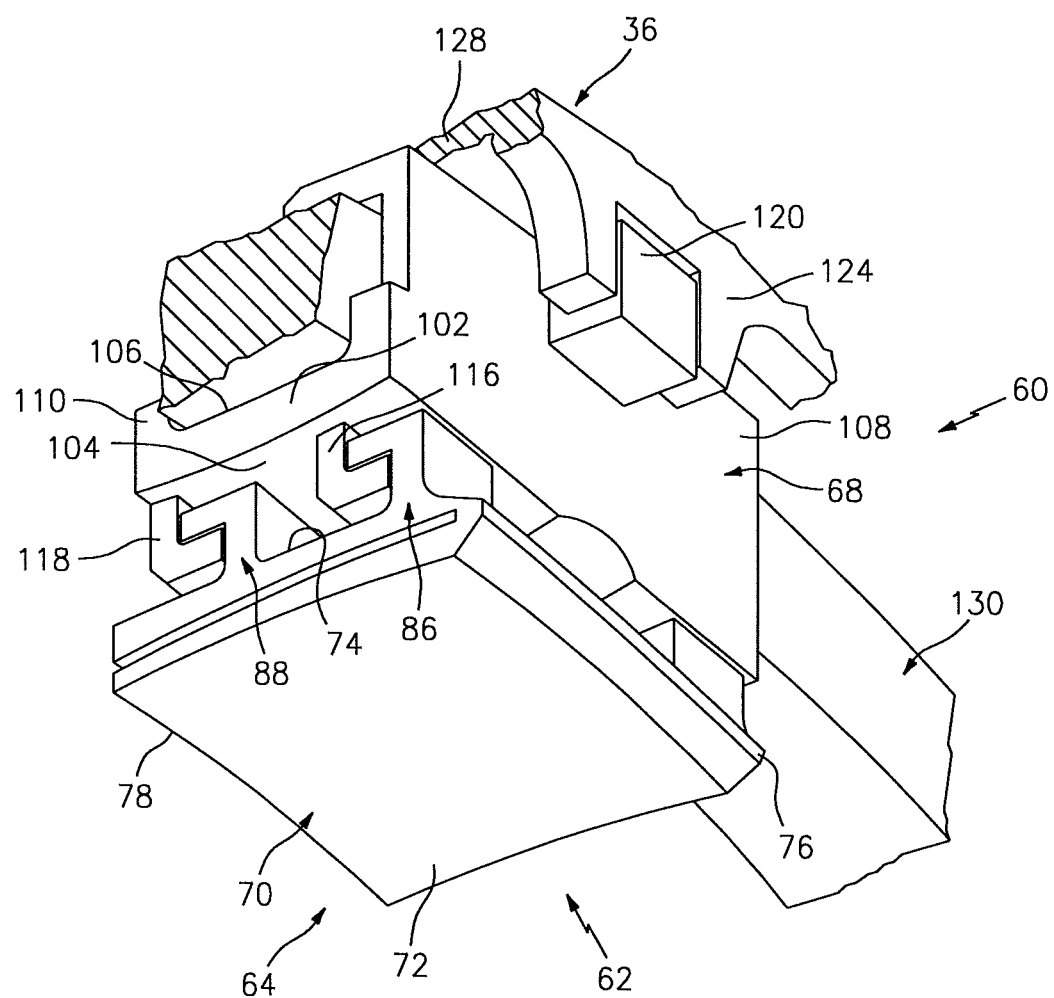
FIG. 4 is an enlarged partial perspective view of a portion of the clearance control system.

Each of the multiple of BOAS carrier segments 68 are at least partially surrounded by a full hoop thermal control ring 130 (also shown in FIG. 4). The full hoop thermal control ring 130 is manufactured of a material with a Coefficient of Thermal Expansion (CTE) different than that of the associated rotor and/or other associated components such as the BOAS carrier segments 68 and BOAS 64. The full hoop thermal control ring 130 may be a solid ring of low CTE material used to control a relatively higher CTE material such as a superalloy by minimization of excessive radial growth at steady state temperatures. The full hoop thermal control ring 130 benefits relatively lighter weight integrally bladed rotors (IBRs) that do not thermally grow to the extent of legacy rotors.

Relatively high CTE materials include alloys such as nickel-based superalloys (e.g., Inco 718). Relatively low CTE materials include ceramics and ceramic matrix composites (CMC). As a practical matter, the low CTE material will have a lower thermal conductivity than the high CTE material.

Engine operation influences the radial thermal expansion of the ring 130, the radial position of the BOAS carrier segments 68 and thus the radial position of the BOAS 64. Such expansion, relative to combined thermal and centrifugal expansion of the associated rotor at the blade tips 29, dictates the change in radial tip clearance TC (FIG. 3). In this manner, local temperature conditions around the engine case are harnessed to passively control the radial tip clearances. The array of BOAS 64 may also be precisely movable between mechanical stops. The required displacement is, at least partially, a function of the engine core size and the dynamic conditions of a particular application. Furthermore, combat aircraft may be subject to rapid acceleration from cruise conditions. Such an acceleration could be from a steady-state cruise condition or could be a reburst wherein the engine had been operating close to full speed/power long enough for temperature to depart from equilibrium cruise conditions whereafter the engine decelerates back to a cruise speed and before the engine can re-equilibrate, reaccelerates. Accordingly, the thermal control ring 130 may be designed with anticipated non-equilibrium situations in mind.

In general, the radial tip clearance will decrease with engine power because, for example, the rotor is subject to both thermal expansion and centrifugal/inertial expansion, whereas the ring 130 is subject only to thermal expansion and the blade and disk materials have relatively high CTE so there is not much opportunity for use of a sufficiently higher thermal control ring material to counter the centrifugal/inertial expansion.

Figure 5:
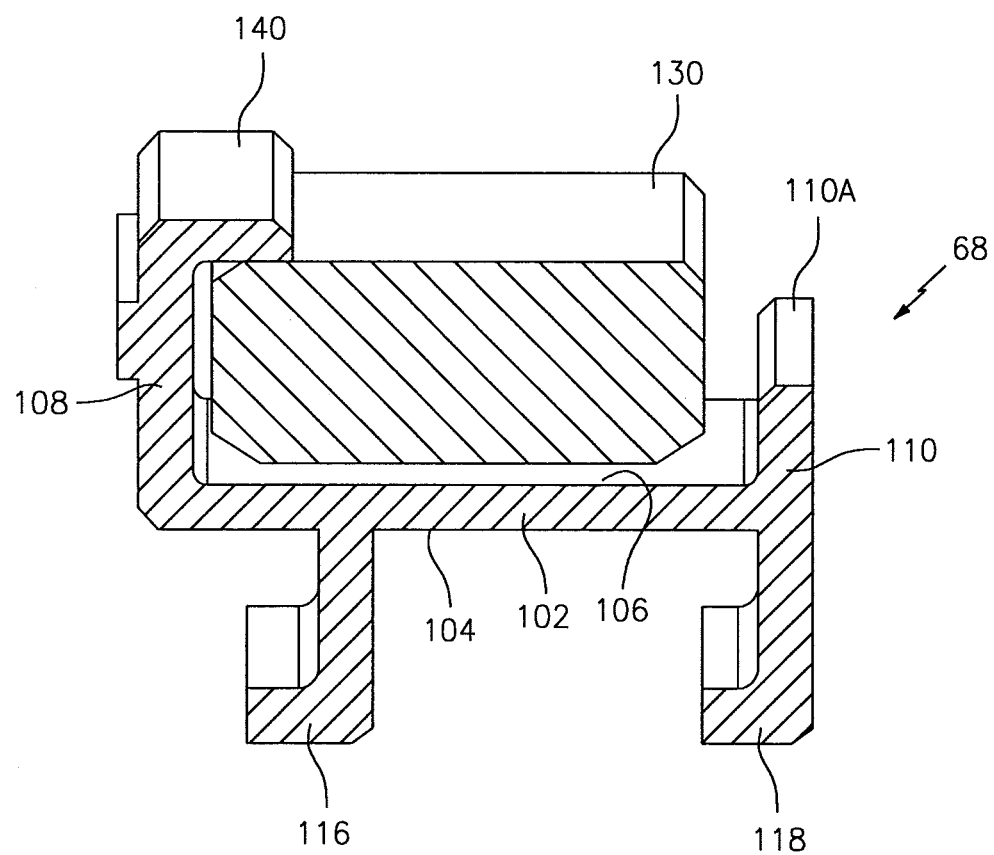
FIG. 5 is an enlarged sectional view of a BOAS carrier segment of the clearance control system according to one disclosed non-limiting embodiment.
Figure 6:
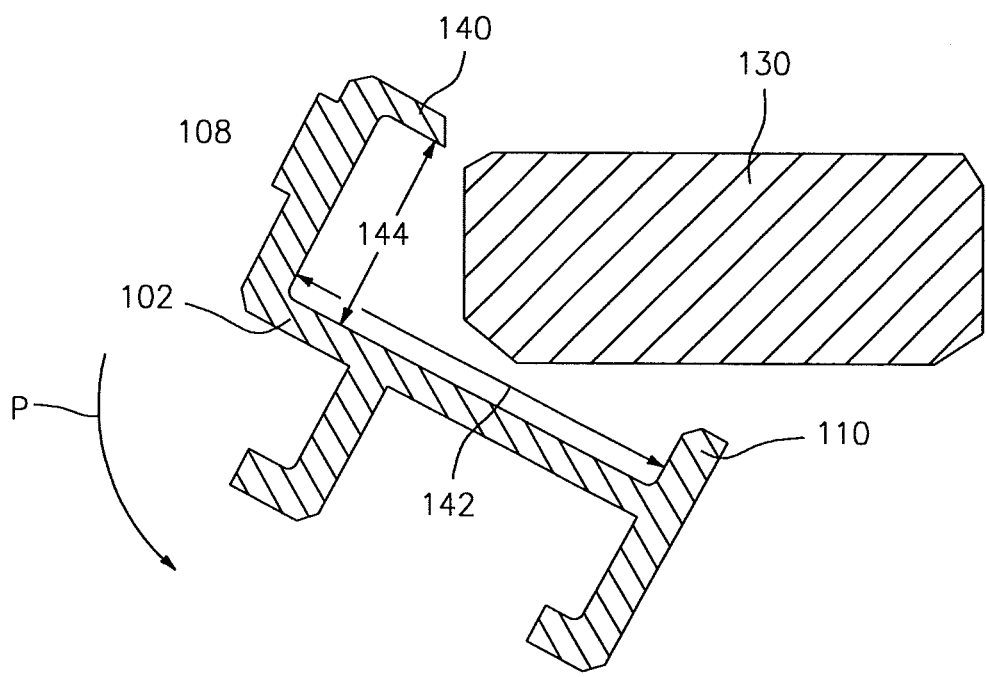
FIG. 6 is schematic view of the BOAS carrier segment being pivotally mounted to a thermal control ring.

With reference to FIG. 5, an outer axial wall 140 of each of the multiple of BOAS carrier segments 68 extends axially aft from the forward wall 108 generally parallel to the inner axial wall 102. An axial length 142 of the outer axial wall 140 and a radial distance 144 between the outer axial wall 140 and the inner axial wall 102 are sized so that each of the multiple of BOAS carrier segments 68 may be pivoted (illustrated schematically by arrow P; FIG. 6) onto the thermal control ring 130 such that the thermal control ring 130 is retained between the forward wall 108 and an aft end wall 110A that extends beyond the outer surface 106 of the inner axial wall 102. In one disclosed non-limiting embodiment, the aft end wall 110A is in-line with aft wall 110. Through the pivoting mounting arrangement, the BOAS carrier segments 68 need not be axially split and assembled with a multiple of fasteners. This eliminates hardware and tolerance stack issues, and allows the BOAS 64 to be supported by a single axially continuous machined component.

Figure 7:
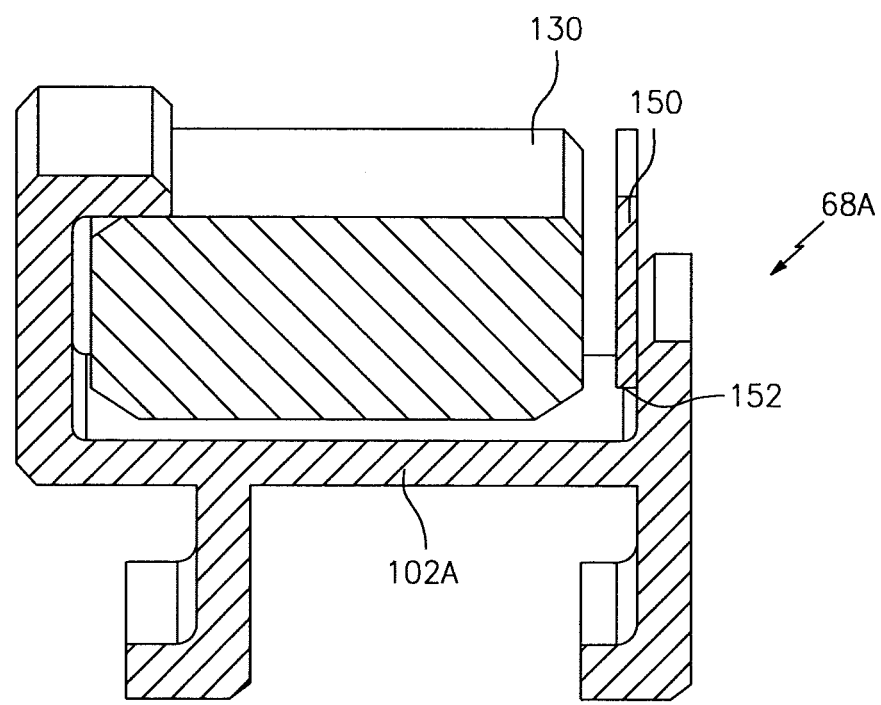
FIG. 7 is an enlarged sectional view of a BOAS carrier segment according to another disclosed non-limiting embodiment.
Figure 8:
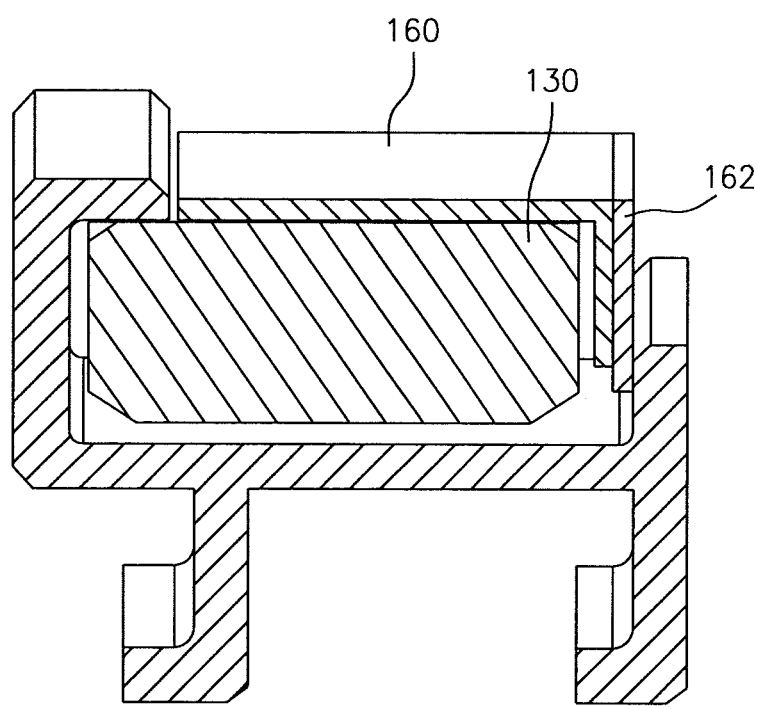
FIG. 8 is an enlarged sectional view of a BOAS carrier segment according to still another disclosed non-limiting embodiment.

With reference to FIG. 7, in another disclosed non-limiting embodiment, a snap ring 150 is mounted to the BOAS carrier segments 68A to axially retain the thermal control ring 130. That is, the snap ring 150 further restricts axial movement of the thermal control ring 130. The snap ring 150 may be received within a groove 152 in the outer surface 106 of the inner axial wall 102A.

In yet another disclosed non-limiting embodiment, a heat shield 160 may be mounted to the BOAS carrier segments 68 to encapsulate the thermal control ring 130. The response of the relatively low CTE thermal control ring 130 is further slowed by the heat shield 160 and/or a thermal barrier coating on the thermal control ring 130. That is, the heat shield 160 slows the transient response to changing operational conditions. The heat shield may be generally L-shaped in cross section and be further retained axially by a snap ring 162.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A clearance control system of a gas turbine engine, the system comprising:
    a full hoop thermal control ring;
    a multiple of carrier segments, each of the carrier segments including an inner axial wall, an outer axial wall, a forward wall and an aft wall, the inner axial wall extending between the forward wall and the aft wall, the outer axial wall extending in parallel to the inner axial wall, and each of the carrier segments pivotally received onto the full hoop thermal control ring such that the full hoop thermal control ring is retained between the forward wall and the aft wall; and
    a multiple of blade outer air seals mounted to the multiple of carrier segments.

2. The system as recited in claim 1, wherein the multiple of blade outer air seals locally bound a radially outboard extreme of a core flowpath through the gas turbine engine.

3. The system as recited in claim 1, wherein each of the multiple of carrier segments include a forward feature and an aft feature engaged with respective reciprocally directed blade outer air seal forward features and aft features.

4. The system as recited in claim 1, wherein the aft wall comprises an end wall that extends radially beyond an outer surface of the inner axial wall.

5. The system as recited in claim 4, further comprising a heat shield mounted between the outer axial wall and the end wall.

6. The system as recited in claim 5, wherein the heat shield is L-shaped in cross section.

7. The system as recited in claim 4, further comprising a snap ring to at least partially axially retain the full hoop thermal control ring.

8. The system as recited in claim 1, wherein the outer axial wall extends from the forward wall.

9. The system as recited in claim 1, further comprising a forward feature and an aft feature that extend radially from the inner axial wall.

10. A method of assembling a clearance control system for a gas turbine engine, the method comprising:
    providing a full hoop thermal control ring;
    providing a multiple of carrier segments, each of the carrier segments including an inner axial wall, an outer axial wall, a forward wall and an aft wall, the inner axial wall extending between the forward wall and the aft wall, the outer axial wall extending in parallel to the inner axial wall; and
    pivotally receiving each of the carrier segments onto the full hoop thermal control ring such that the full hoop thermal control ring is retained between the forward wall and the aft wall of each of the carrier segments.

11. The method as recited in claim 10, further comprising mounting a multiple of blade outer air seals to each of the carrier segments.

12. The method as recited in claim 11, further comprising sealing each of the multiple of blade outer air seals to one another.

13. The method as recited in claim 10, further comprising at least partially encapsulating the full hoop thermal control ring with a heat shield.

14. The method as recited in claim 13, further comprising axially retaining the heat shield.

15. A clearance control system of a gas turbine engine, the system comprising:
    a full hoop thermal control ring;
    a multiple of carrier segments, a first of the carrier segments including an inner axial wall, an outer axial wall, a forward wall and an aft wall, the inner axial wall extending between the forward wall and the aft wall, the outer axial wall extending in parallel to the inner axial wall, and each of the carrier segments pivotally received onto the full hoop thermal control ring such that the full hoop thermal control ring is retained between the forward wall and the aft wall; and
    a multiple of blade outer air seals mounted to the carrier segments.

* * * * *